United States Patent Office.

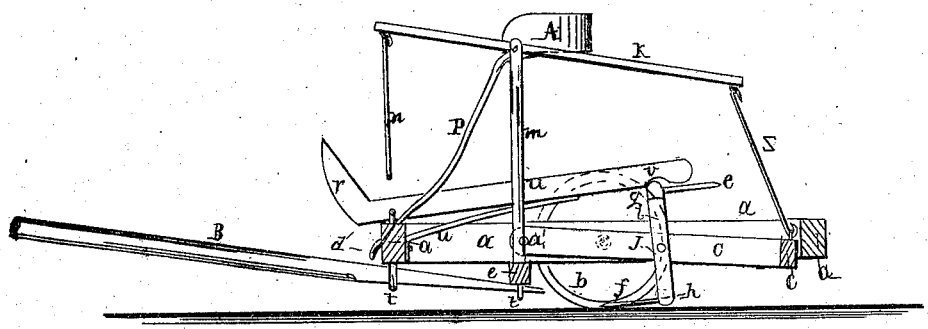

NICHOLAS SELBY, OF FLORA, ILLINOIS.

Letters Patent No. 83,326, dated October 20, 1868.

IMPROVEMENT IN HORSE-RAKES.

The Schedule referred to in these Letters Patent and making part of the same.

*To all whom it may concern:*

Be it known that I, NICHOLAS SELBY, of Flora, in the county of Clay, and State of Illinois, have invented a new and useful Improvement in Horse-Rakes; and I do hereby declare that the following is a full, clear, and exact description thereof, which will enable others skilled in the art to make and use the same, reference being had to the accompanying drawings, forming part of this specification, in which—

Figure 1 is a section of my improved rake, through the line $x\ x$ of fig. 2.

Figure 2 is a plan view of the same.

Similar letters of reference indicate like parts.

This invention is designed as an improvement upon a rake patented by J. C. and E. D. Turner, of Bridgeport, Lawrence county, Illinois, in August of 1867.

The improvement consists in providing a balanced or sulky-frame, which is pivoted on two draught-wheels, and provided with a hinged frame, which supports the revolving rake, nothing new being claimed in the construction of the rake itself.

By reference to the drawings, the sulky-frame $a\ a\ a$ is balanced on the wheels $b\ b$, by means of axles $b'\ b'$, projecting from the said frame.

A tongue, B, is affixed to the frame $a\ a\ a$, by means of hounds $q\ q$ and staples $t\ t$, or other suitable fastenings.

The revolving rake consists of the rectangular frame $g\ h\ i$, having two rows of teeth, $e\ e\ e$, &c., $f\ f\ f$, projecting from the frame, in opposite directions, as shown.

This rake revolves upon the rod $j$, the ends of which latter are affixed in the hinged frame $c\ c\ c\ c$.

The trip-stick $u$ is pivoted to the front of the frame $a$, and is provided with a notch, $v$, to catch the horizontal parts $g$ and $h$ of the rake, and hold the same until a sufficient quantity of hay is gathered, when the trip-stick is raised, by pressing upon the foot $r$, which operation lifts the notch from the rake, and permits the latter to be revolved backward, by the friction of the lower teeth, and the hay collected against them, which revolution brings the upper teeth in contact with the ground, and the friction causes the rake to complete the revolution, bringing the lately-filled teeth to the top, to be stopped by the trip-stick notch, as before.

The trip-stick is actuated downward, by means of a spring, $w$, one end of which is affixed to the front of the frame $a\ a\ a$, and the other is formed with a slot, which encloses a stud, having a head, to keep the trip-stick and spring in contact.

A lever, $k$, pivoted to an upright, $m$, arising from the cross-brace $e$ of the frame $a\ a\ a$, is connected with the hinged frame $c\ c\ c$ by a link, $l$, whereby the rake is raised from the ground in going to and from the field.

A stirrup-link, $n$, attached to the lever, catches under a hook, $a'$, and the frame $a\ a\ a$, and holds the frame $c\ c\ c$ and the rake in the raised position.

A is the driver's seat, supported by the iron braces $p\ p$.

Having thus described my invention,

I claim as new, and desire to secure by Letters Patent—

1. The arrangement of the hinged frame $c$, carrying the revolving rake within the rectangular balanced frame $a\ a\ a\ a$, all constructed and combined to operate substantially as and for the purpose herein shown and described.

2. The notched trip-stick $u\ r$, when hinged to the front cross-bar of the frame $a$, and combined with a spring, $w$, whereby said stick $u$ is actuated downward, and held in contact with the rake-head, as herein shown and described.

3. The described arrangement of the pivoted lever $k$, link $l$, and stirrup-link $n$, with relation to the rectangular balanced frame $a$ and hinged rake-frame $c$, as herein shown, for the purpose set forth.

NICHOLAS SELBY.

Witnesses:
J. F. HEAP,
W. S. ROBINSON.